(12) United States Patent
Wilson

(10) Patent No.: US 10,705,410 B1
(45) Date of Patent: Jul. 7, 2020

(54) SHRINKABLE CAMERA SKIN ASSEMBLY

(71) Applicant: Jeffrey Wilson, Silverthorne, CO (US)

(72) Inventor: Jeffrey Wilson, Silverthorne, CO (US)

( * ) Notice: Subject to any disclaimer, the term of this patent is extended or adjusted under 35 U.S.C. 154(b) by 0 days.

(21) Appl. No.: 16/281,247

(22) Filed: Feb. 21, 2019

(51) Int. Cl.
  *G03B 17/02* (2006.01)
  *G03B 17/04* (2006.01)
  *H04N 5/225* (2006.01)
  *G03B 17/56* (2006.01)

(52) U.S. Cl.
  CPC ............ *G03B 17/04* (2013.01); *G03B 17/56* (2013.01); *H04N 5/2252* (2013.01)

(58) Field of Classification Search
  CPC .................................................... G03B 17/02
  See application file for complete search history.

(56) References Cited

U.S. PATENT DOCUMENTS

| | | | |
|---|---|---|---|
| 4,917,241 A | 4/1990 | Hanson | |
| 6,311,017 B1 | 10/2001 | Mori | |
| 7,293,648 B2 | 11/2007 | Doran | |
| 8,457,481 B2 | 6/2013 | Miglioli | |
| D704,243 S | 5/2014 | Ikegame | |
| 8,781,312 B1 * | 7/2014 | deSouza, Jr. | ......... A45C 11/38 396/27 |
| 8,878,986 B2 | 11/2014 | Zou | |
| 2008/0247750 A1 | 10/2008 | Law | |

* cited by examiner

*Primary Examiner* — Minh Q Phan

(57) ABSTRACT

A shrinkable camera skin assembly for altering the appearance of a camera body includes a camera wrap is positionable around a camera body to alter the appearance of the camera body. The camera wrap has a plurality of openings therein each being aligned with respective structural features of the camera body. A lens wrap is wrapped around a body of a camera lens to alter the appearance of the body of the camera lens. A hood wrap is wrapped around a lens hood to alter the appearance of the lens hood. Each of the camera wrap, the lens wrap and the hood wrap is comprised of a heat shrink material. Thus, the camera, lens and hood wraps can shrink around the respective camera body, camera lens and lens hood.

8 Claims, 6 Drawing Sheets

SHRINKABLE CAMERA SKIN ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to skin devices and more particularly pertains to a new skin device for altering the appearance of a camera body.

BRIEF SUMMARY OF THE INVENTION

An embodiment of the disclosure meets the needs presented above by generally comprising a camera wrap is positionable around a camera body to alter the appearance of the camera body. The camera wrap has a plurality of openings therein each being aligned with respective structural features of the camera body. A lens wrap is wrapped around a body of a camera lens to alter the appearance of the body of the camera lens. A hood wrap is wrapped around a lens hood to alter the appearance of the lens hood. Each of the camera wrap, the lens wrap and the hood wrap is comprised of a heat shrink material. Thus, the camera, lens and hood wraps can shrink around the respective camera body, camera lens and lens hood.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
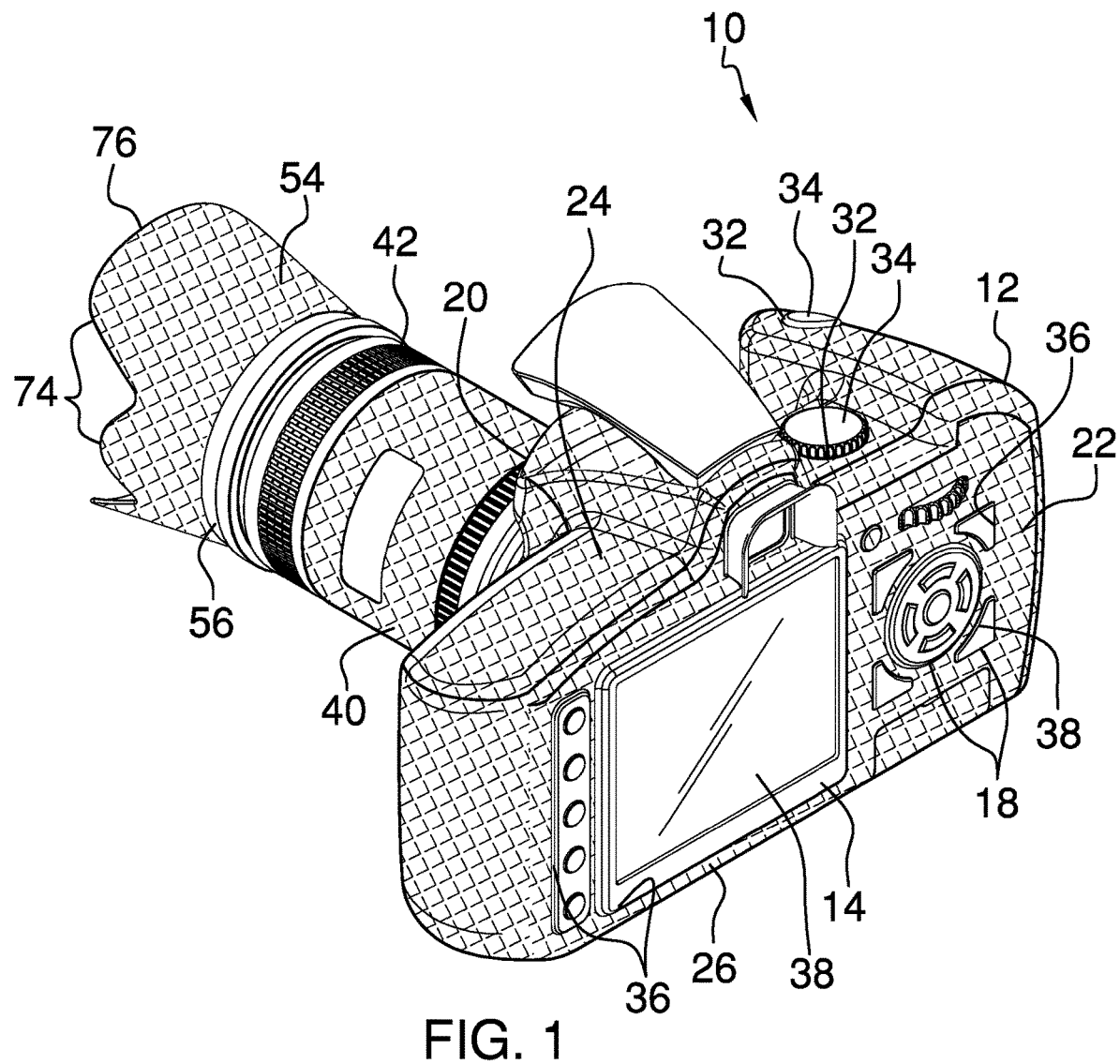
FIG. 1 is a back perspective view of a shrinkable camera skin assembly according to an embodiment of the disclosure.
Figure 2:
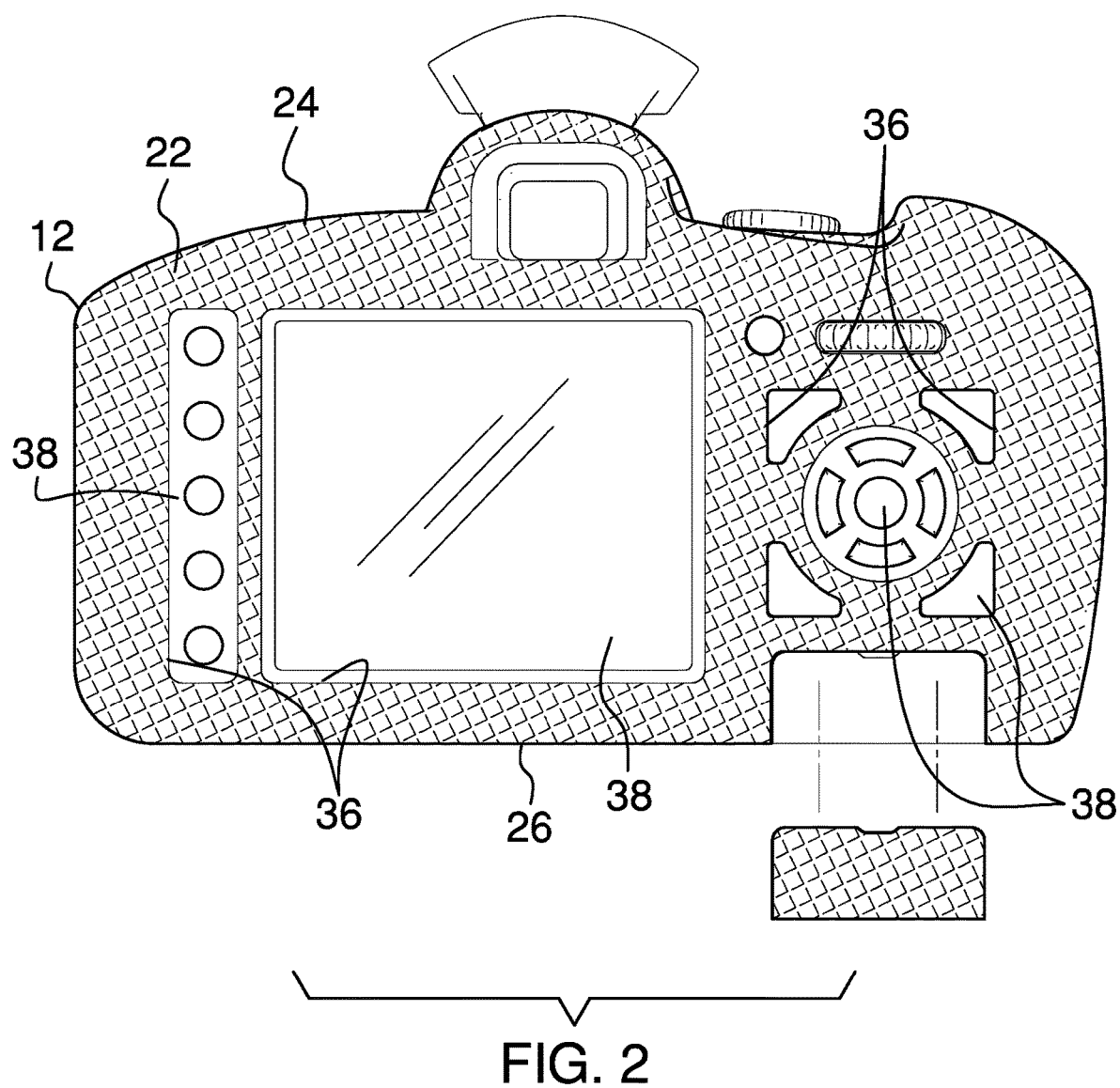
FIG. 2 is a back view of an embodiment of the disclosure.
Figure 3:
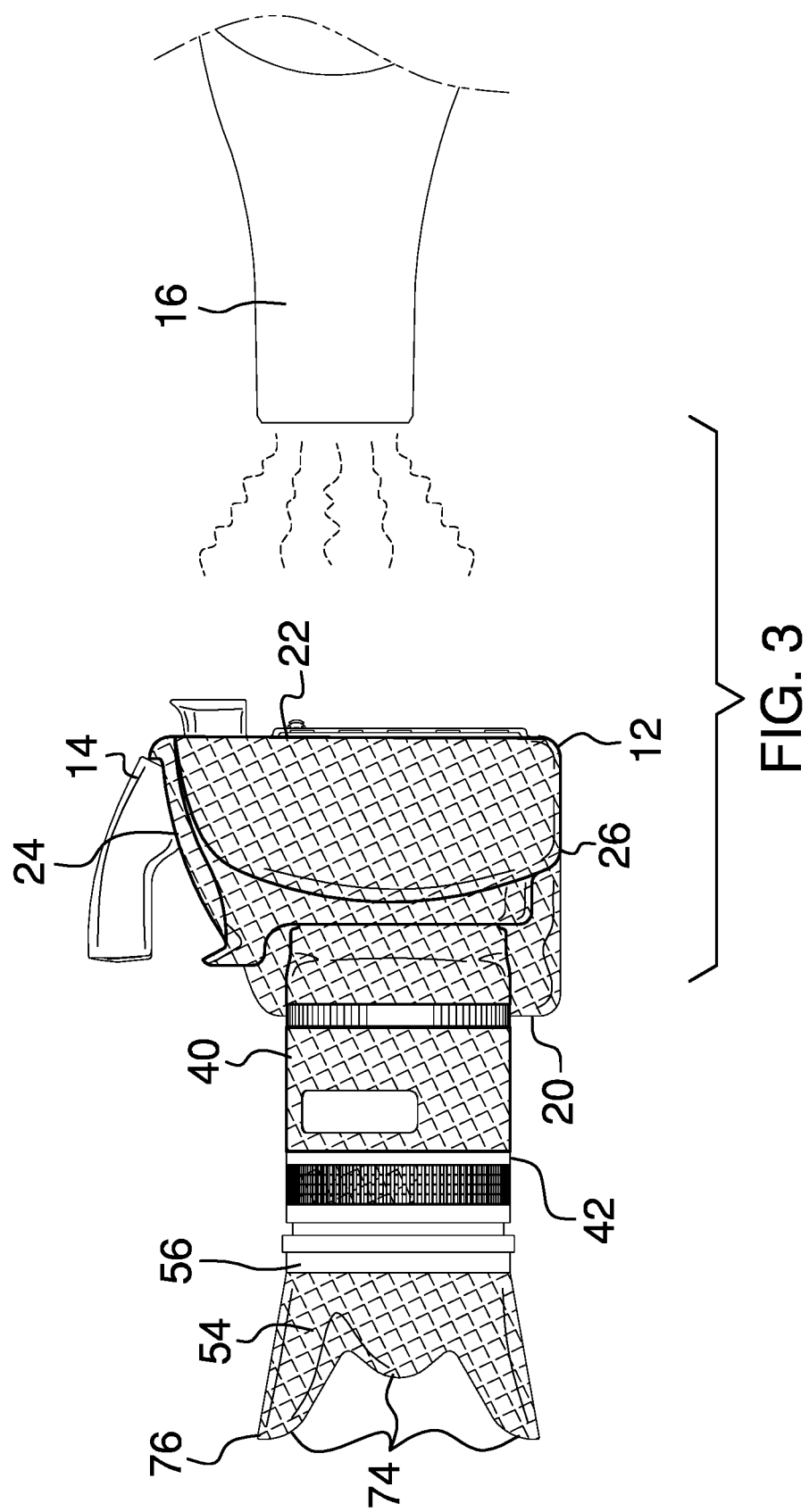
FIG. 3 is a perspective in-use view of an embodiment of the disclosure.
Figure 4:
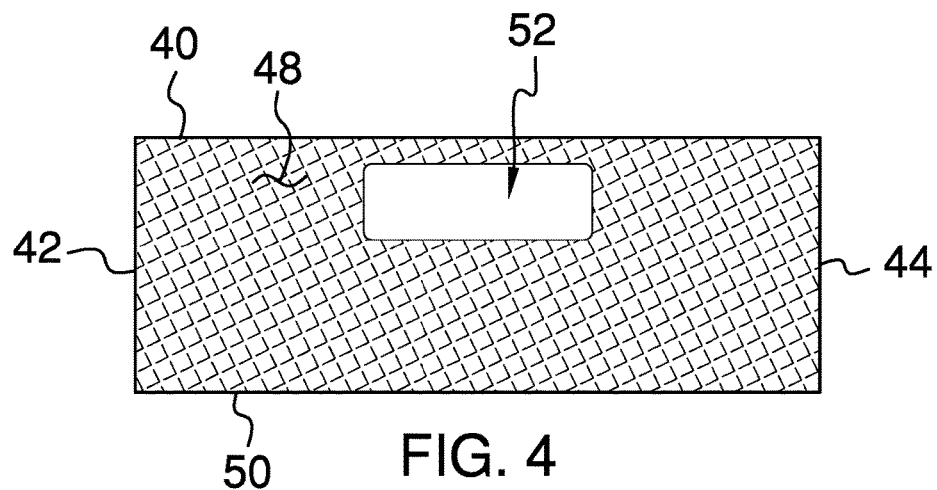
FIG. 4 is a top view of lens wrap of an embodiment of the disclosure.
Figure 5:
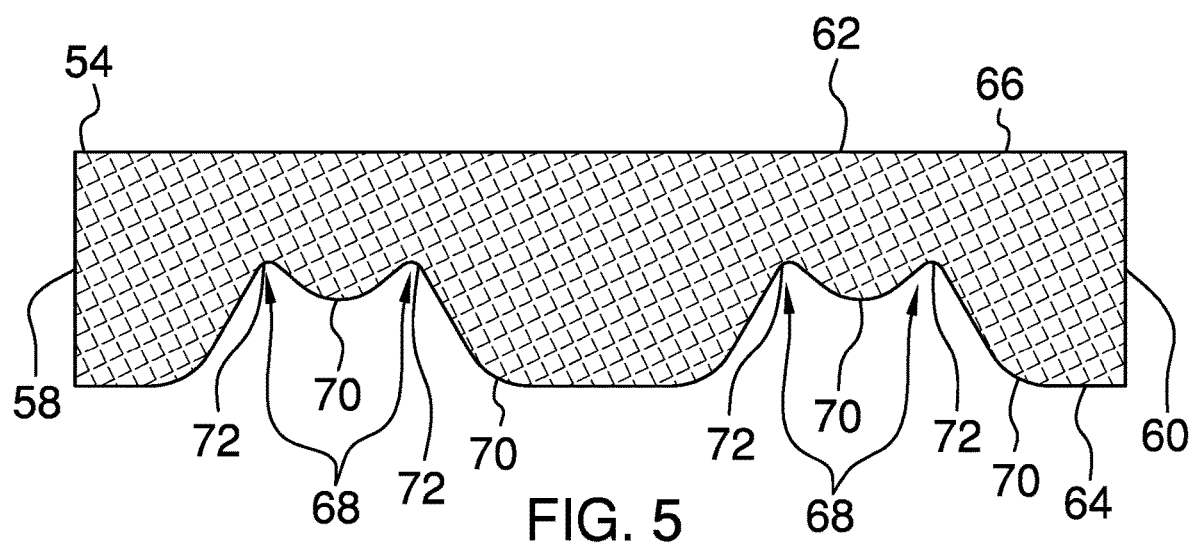
FIG. 5 is a top view a hood wrap of an embodiment of the disclosure.
Figure 6:
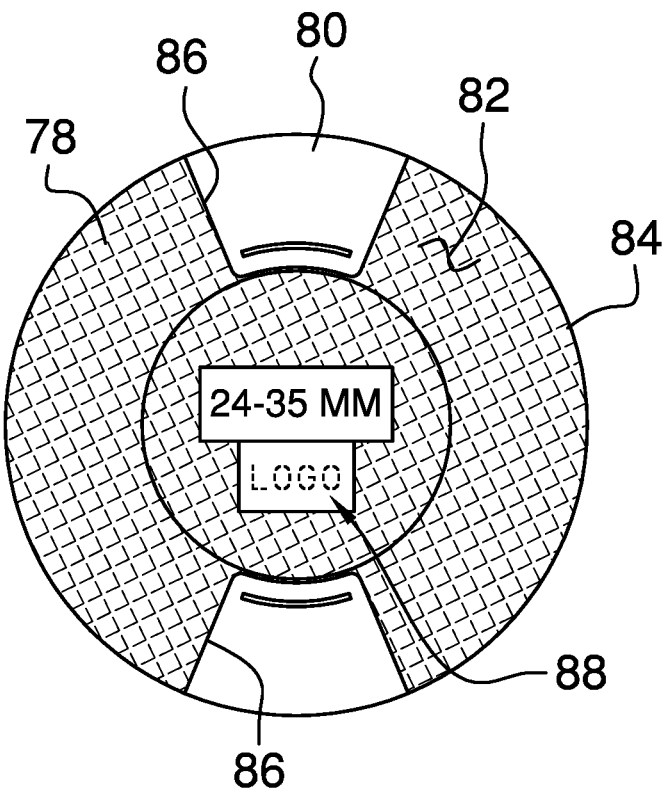
FIG. 6 is a front view of a lens cap cover of an embodiment of the disclosure.
Figure 7:
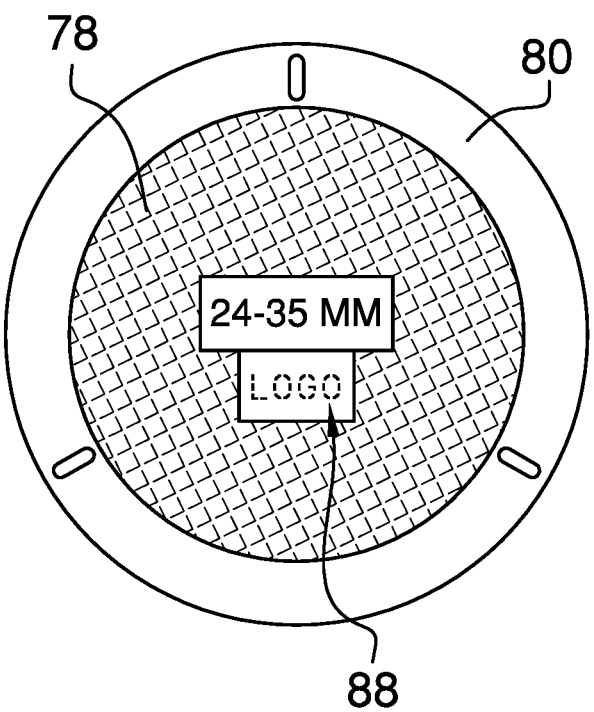
FIG. 7 is a perspective view a lens cap cover of an embodiment of the disclosure.
Figure 8:
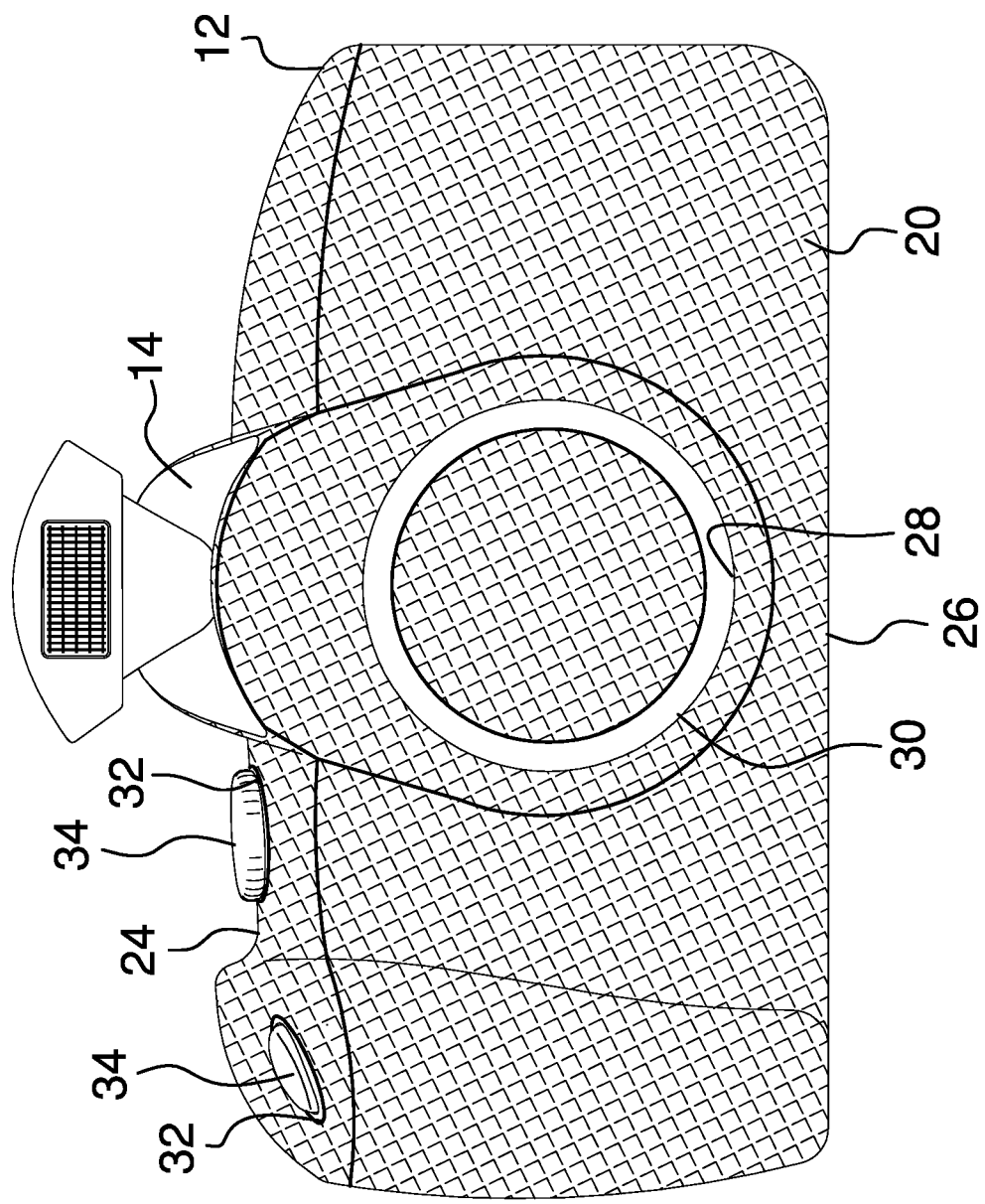
FIG. 8 is a front view of an embodiment of the disclosure.

With reference now to the drawings, and in particular to FIGS. 1 through 8 thereof, a new skin device embodying the principles and concepts of an embodiment of the disclosure and generally designated by the reference numeral 10 will be described.

As best illustrated in FIGS. 1 through 8, the shrinkable camera skin assembly 10 generally comprises a camera wrap 12 that is positionable around a camera body 14. The camera wrap 12 is manufactured with a predetermined color thereby facilitating the camera wrap 12 to alter the appearance of the camera body 14. The camera wrap 12 is comprised of a heat shrink material thereby facilitating the camera wrap 12 to shrink around the camera body 14 when the camera wrap 12 is exposed to a heat source 16. In this way the camera wrap 12 conforms to contours of the camera body 14. The heat shrink material may be a thermoplastic material, such as polyvinyl chloride or the like. The camera wrap 12 has a plurality of openings 18 therein and each of the openings 18 is aligned with respective structural features of the camera body 14. Thus, each of the structural features is exposed and accessible when the camera wrap 12 is positioned around the camera body 14. The camera body 14 may be that of a DSL camera, a 35 mm film camera or any other type of camera, either digital or analog, that is structured in the manner of conventional camera bodies.

The camera wrap 12 has a front wall 20, a back wall 22, a top wall 24 and a bottom wall 26, and the front wall 20 has a lens aperture 28 extending therethrough. The lens aperture 28 is positioned at a predetermined location corresponding to a location of a lens opening 30 on the camera body 14. Thus, the lens opening 30 is exposed and accessible when the camera wrap 12 is positioned around the camera body 14. The top wall 24 has a plurality of knob apertures 32 each extending therethrough and each of the knob apertures 32 is positioned at predetermined locations corresponding to respective control knobs 34 on the camera body 14. Thus, each of the control knobs 34 is exposed and accessible when the camera wrap 12 is positioned around the camera body 14.

The back wall 22 has a plurality of control openings 36 each extending therethrough. Each of the control openings 36 has a predetermined shape and is positioned at a predetermined location corresponding to respective controls 38 on the camera body 14. In this way the controls 38 are exposed and accessible when the camera wrap 12 is positioned around the camera body 14. Each of the front 20, back 22, top 24 and bottom 26 walls may include additional openings to correspond to the design of any existing camera body 14.

A lens wrap 40 is provided and the lens wrap 40 is wrapped around a body of a camera lens 42 to alter the appearance of the body of the camera lens 42. The lens wrap 40 is comprised of a heat shrink material thereby facilitating the lens shrink around the body of the camera lens 42 when lens wrap 40 is exposed to a heat source 16. In this way the lens wrap 40 can conform to contours of the body of the camera lens 42. The body of the camera lens 42 may be that of a camera lens of any conventional size or design.

The lens wrap 40 has a first end 44, a second end 46, a top surface 48 and a bottom surface 50, and the lens wrap 40 is elongated between the first 44 and second 46 ends. The lens wrap 40 has at least one opening 52 extending through the top 48 and bottom 50 surfaces. The at least one opening 52 in the lens wrap 40 is positioned at a predetermined location corresponding to a location of a control on the body of the camera lens 42. Thus, the control on the body of the camera lens 42 is exposed and accessible when the lens wrap 40 is positioned around the body of the camera lens 42. The bottom surface 50 abuts the body of the camera lens 42 having the first end 44 engaging the second end 46 when the lens wrap 40 is wrapped around the body of the camera lens 42.

A hood wrap 54 is provided and the hood wrap 54 is wrapped around a lens hood 56 to alter the appearance of the lens hood 56. The hood wrap 54 is comprised of a heat shrink material thereby facilitating the hood wrap 54 to shrink around the lens hood 56 when the hood wrap 54 is exposed to a heat source 16. In this way the hood wrap 54 conforms to contours of the lens hood 56. The lens hood 56 may be a lens hood 56 of any conventional size and design.

The hood wrap 54 has a primary end 58, a secondary end 60 and a peripheral edge 62 extending therebetween, and the peripheral edge 62 has a front side 64 and a back side 66. The hood wrap 54 is elongated between the primary 58 and secondary 60 ends, and the front side 64 has a plurality of indentations 68 each extending toward the back side 66. The indentations 68 are spaced apart from each other and are distributed between the primary 58 and secondary 60 ends to define an alternating sequence of hills 70 and valleys 72 on the front side 64. Moreover, each of the hills 70 and valleys 72 is positioned at predetermined locations and has a predetermined depth corresponding to a location and size of a respective protrusion 74 on a leading edge 76 of the lens hood 56. In this way the front side 64 of the peripheral edge 62 of the hood wrap 54 conforms to the leading edge 76 of the lens hood 56.

A plurality of lens cap covers 78 is provided and each of the lens cap covers 78 is positionable on a respective lens cap 80 to alter the appearance of the respective lens cap 80. Each of the lens cap covers 78 is comprised of a heat shrink material thereby facilitating each of the lens cap covers 78 to shrink around the respective lens cap 80 when the lens cap covers 78 are exposed to a heat source 16. Thus, each of the lens cap covers 78 can conform to contours of the respective lens cap 80. Each of the respective lens caps 80 may be camera lens caps of any conventional size and design.

Each of the lens cap covers 78 has a first surface 82 and an outer edge 84; the outer edge 84 of each of the lens cap covers 78 is continuously arcuate about a center point of the lens cap covers 78 such that each of the lens cap covers 78 has a disk shape. The outer edge 84 of each of the lens cap covers 78 has indentations 86 therein each being positioned to correspond to buttons or releases on the respective lens cap 80. Thus, the buttons or releases are exposed and accessible when the lens cap cover 78 is positioned on the respective lens cap 80. Additionally, indicia 88 may be printed on the first surface 82 of the lens cap cover 78 and the indicia 88 may comprise a company logo or any other image.

In use, the camera wrap 12 is positioned around the camera body 14 and each of the lens apertures 28, knob apertures 32 and control openings 36 is aligned with the respective lens opening 30, control knobs 34 and controls 38 on the camera body 14. The camera wrap 12 is exposed to the heat source 16 to shrink the camera wrap 12 around the camera body 14 and thusly conform to the contours of the camera body 14. Thus, the camera wrap 12 not only covers any existing scratches or damage, but the camera wrap 12 protects the camera body 14 from further scratches or damage. Each of the lens wrap 40 and the hood wrap 54 are wrapped around the respective camera lens 42 and lens hood 56. Each of the lens and hood wrap 54s are exposed to the heat source 16 to shrink the lens and hood wrap 54s around the respective camera lens 42 and lens hood 56. In this way the appearance of an existing camera, camera lenses and lens hood can be altered to any desired color or pattern.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shrinkable camera skin assembly being configured to be wrapped around a camera body and having heat being applied thereto for shrinking around the camera body, said assembly comprising:

a camera wrap being positionable around a camera body wherein said camera wrap is configured to alter the appearance of the camera body, said camera wrap being comprised of a heat shrink material thereby facilitating said camera wrap to shrink around the camera body when said camera wrap is exposed to a heat source wherein said camera wrap is configured to conform to contours of the camera body, said camera wrap having a plurality of openings therein, each of said openings being aligned with respective structural features of the camera body wherein said camera wrap is configured to facilitate each of the structural features to be exposed and accessible when said camera wrap is positioned around the camera body;

a lens wrap being wrapped around a body of a camera lens wherein said lens wrap is configured to alter the appearance of the body of the camera lens, said lens wrap being comprised of a heat shrink material thereby facilitating said lens shrink around the body of the camera lens when lens wrap is exposed to a heat source wherein said lens wrap is configured to conform to contours of the body of the camera lens; and a hood wrap being wrapped around a lens hood wherein said hood wrap is configured to alter the appearance of the lens hood, said hood wrap being comprised of a heat shrink material thereby facilitating said hood wrap to shrink around the lens hood when said hood wrap is exposed to a heat source wherein said hood wrap is configured to conform to contours of the hood lens.

2. The assembly according to claim 1, wherein: said camera wrap has a front wall, a back wall, a top wall and a bottom wall; and said front wall has a lens aperture extending therethrough, said lens aperture being positioned at a predetermined location corresponding to a location of a lens opening on the camera body such that that said lens opening is exposed and accessible when said camera wrap is positioned around the camera body.

3. The assembly according to claim 2, wherein: said top wall has a plurality of knob apertures each extending therethrough, each of said knob apertures being positioned at predetermined locations corresponding to respective control knobs on the camera body such that each of said control knobs is exposed and accessible when said camera wrap is positioned around the camera body; and said back wall has a plurality of control openings each extending therethrough, each of said control openings having a predetermined shape and being positioned at a predetermined location corresponding to respective controls on the camera body such that the controls are exposed and accessible when said camera wrap is positioned around the camera body.

4. The assembly according to claim 1, wherein: said lens wrap has a first end, a second end, a top surface and a bottom surface, said lens wrap being elongated between said first and second ends; and said lens wrap having at least one opening extending through said top and bottom surfaces, said at least one opening being positioned at a predetermined location corresponding to a location of a control on the body of the camera lens such that the control on the body of the camera lens is exposed and accessible when said lens wrap is positioned around the body of the camera lens, said bottom surface abutting the body of the camera lens having said first end engaging said second end when said lens wrap is wrapped around the body of the camera lens.

5. The assembly according to claim 1, wherein said hood wrap has a primary end, a secondary end and a peripheral edge extending therebetween, said peripheral edge having a front side and a back side, said hood wrap being elongated between said primary and secondary ends, said front side having a plurality of indentations each extending toward said rear side, said indentations being spaced apart from each other and being distributed between said primary and secondary ends to define an alternating sequence of hills and valleys on said front side.

6. The assembly according to claim 5, wherein each of said hills and valleys is positioned at predetermined locations and having a predetermined depth corresponding to a location and size of a respective protrusion on a leading edge of the lens hood such that said front side of said peripheral edge of said hood wrap conforms to the leading edge of the lens hood.

7. The assembly according to claim 1, further comprising: a plurality of lens cap covers, each of said lens cap covers being positionable on a respective lens cap wherein each of said lens cap covers is configured to alter the appearance of the respective lens cap, each of said lens cap covers being comprised of a heat shrink material thereby facilitating each of said lens cap covers to shrink around the respective lens cap when said lens cap covers are exposed to a heat source wherein each of said lens cap covers is configured to conform to contours of the respective lens cap; and each of said lens cap covers having a first surface and an outer edge, said outer edge of each of said lens cap covers being continuously arcuate about a center point of said lens cap covers such that each of said lens cap covers has a disk shape.

8. A shrinkable camera skin assembly being configured to be wrapped around a camera body and having heat being applied thereto for shrinking around the camera body, said assembly comprising:

a camera wrap being positionable around a camera body wherein said camera wrap is configured to alter the appearance of the camera body, said camera wrap being comprised of a heat shrink material thereby facilitating said camera wrap to shrink around the camera body when said camera wrap is exposed to a heat source wherein said camera wrap is configured to conform to contours of the camera body, said camera wrap having a plurality of openings therein, each of said openings being aligned with respective structural features of the camera body wherein said camera wrap is configured to facilitate each of the structural features to be exposed and accessible when said camera wrap is positioned around the camera body, said camera wrap having a front wall, a back wall, a top wall and a bottom wall, said front wall having a lens aperture extending therethrough, said lens aperture being positioned at a predetermined location corresponding to a location of a lens opening on the camera body such that that said lens opening is exposed and accessible when said camera wrap is positioned around the camera body, said top wall having a plurality of knob apertures each extending therethrough, each of said knob apertures being positioned at predetermined locations corresponding to respective control knobs on the camera body such that each of said control knobs is exposed and accessible when said camera wrap is positioned around the camera body, said back wall having a plurality of control openings each extending therethrough, each of said control openings having a predetermined shape and being positioned at a predetermined location corresponding to respective controls on the camera body such that the controls are exposed and accessible when said camera wrap is positioned around the camera body;

a lens wrap being wrapped around a body of a camera lens wherein said lens wrap is configured to alter the appearance of the body of the camera lens, said lens wrap being comprised of a heat shrink material thereby facilitating said lens shrink around the body of the camera lens when lens wrap is exposed to a heat source wherein said lens wrap is configured to conform to contours of the body of the camera lens, said lens wrap having a first end, a second end, a top surface and a bottom surface, said lens wrap being elongated between said first and second ends, said lens wrap having at least one opening extending through said top and bottom surfaces, said at least one opening being positioned at a predetermined location corresponding to a location of a control on the body of the camera lens such that the control on the body of the camera lens is exposed and accessible when said lens wrap is positioned around the body of the camera lens, said bottom surface abutting the body of the camera lens having said first end engaging said second end when said lens wrap is wrapped around the body of the camera lens;

a hood wrap being wrapped around a lens hood wherein said hood wrap is configured to alter the appearance of the lens hood, said hood wrap being comprised of a heat shrink material thereby facilitating said hood wrap to shrink around the lens hood when said hood wrap is exposed to a heat source wherein said hood wrap is configured to conform to contours of the hood lens, said hood wrap having a primary end, a secondary end and a peripheral edge extending therebetween, said peripheral edge having a front side and a back side, said hood wrap being elongated between said primary and secondary ends, said front side having a plurality of indentations each extending toward said rear side, said indentations being spaced apart from each other and being distributed between said primary and secondary ends to define an alternating sequence of hills and valleys on said front side, each of said hills and valleys being positioned at predetermined locations and having a predetermined depth corresponding to a location and size of a respective protrusion on a leading edge of the lens hood such that said front side of said peripheral edge of said hood wrap conforms to the leading edge of the lens hood; and a plurality of lens cap covers, each of said lens cap covers being positionable on a respective lens cap wherein each of said lens cap covers is configured to alter the appearance of the respective lens cap, each of said lens cap covers being comprised of a heat shrink material thereby facilitating each of said lens cap covers to shrink around the respective lens cap when said lens cap covers are exposed to a heat source wherein each of said lens cap covers is configured to conform to contours of the respective lens cap, each of said lens cap covers having a first surface and an outer edge, said outer edge of each of said lens cap covers being continuously arcuate about a center point of said lens cap covers such that each of said lens cap covers has a disk shape.

* * * * *